(12) United States Patent
Murata (10) Patent No.: US 10,214,054 B2
(45) Date of Patent: Feb. 26, 2019

(54) PNEUMATIC TIRE (71) Applicant: The Yokohama Rubber Co., LTD., Minato-ku, Tokyo (JP)

(72) Inventor: Takahisa Murata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 57 days.

(21) Appl. No.: 14/907,104

(22) PCT Filed: May 7, 2014

(86) PCT No.: PCT/JP2014/062256
§ 371 (c)(1),
(2) Date: Jan. 22, 2016

(87) PCT Pub. No.: WO2015/011964
PCT Pub. Date: Jan. 29, 2015

(65) Prior Publication Data
US 2016/0152084 A1    Jun. 2, 2016

(30) Foreign Application Priority Data

Jul. 23, 2013 (JP) .................. 2013-152766

(51) Int. Cl.
*B60C 11/03* (2006.01)
*B60C 11/12* (2006.01)
*B60C 11/13* (2006.01)

(52) U.S. Cl.
CPC ...... *B60C 11/0302* (2013.01); *B60C 11/0304* (2013.01); *B60C 11/0306* (2013.01);
(Continued)

(58) Field of Classification Search
CPC ............. B60C 11/0302; B60C 11/0304; B60C 11/0306; B60C 11/0309; B60C 11/0318;
(Continued)

(56) References Cited

U.S. PATENT DOCUMENTS

2009/0178745 A1*  7/2009  Ikegami ............. B60C 11/0309
                                                              152/209.8
2009/0229721 A1*  9/2009  Ikeda ................. B60C 11/0306
                                                              152/209.18
(Continued)

FOREIGN PATENT DOCUMENTS

| JP | H03-0220004 | 9/1991 |
| JP | H10-0278514 | 10/1998 |
| JP | 11342706 A  * | 12/1999 |
| JP | 4929466 | 5/2012 |
| JP | 2013-071633 | 4/2013 |
| JP | 2013-112294 | 6/2013 |

(Continued)

OTHER PUBLICATIONS

JPH11342706A—Machine Translation (Espacenet) (Year: 1999).*
(Continued)

*Primary Examiner* — Matthew J Daniels
*Assistant Examiner* — Yunju Kim
(74) *Attorney, Agent, or Firm* — Thorpe North & Western (57) ABSTRACT

A pneumatic tire includes a block pitch length of an outer block row that is greater than a block pitch length of the inner block row. The dimensions in the tire width direction of the regions interposed between two circumferential grooves are smaller in the order of the rib, the outer block row, and the inner block row. The inclined grooves defining and forming the rib open only to the circumferential groove in the vehicle mounting inner side region defining and forming the rib.

16 Claims, 1 Drawing Sheet

(52) U.S. Cl.
CPC ...... *B60C 11/0309* (2013.01); *B60C 11/0318* (2013.01); *B60C 11/0332* (2013.01); *B60C 11/1236* (2013.01); *B60C 11/1353* (2013.01); *B60C 11/1392* (2013.01); *B60C 11/1384* (2013.01); *B60C 2011/0346* (2013.01); *B60C 2011/0372* (2013.01); *B60C 2011/0381* (2013.01); *B60C 2011/0388* (2013.01); *B60C 2011/0395* (2013.01); *B60C 2011/1209* (2013.01); *B60C 2011/1295* (2013.01); *B60C 2011/1361* (2013.01)

(58) Field of Classification Search
CPC ............. B60C 11/0332; B60C 11/1236; B60C 11/1353; B60C 11/1392; B60C 11/1384; B60C 2011/0346; B60C 2011/0372; B60C 2011/0381; B60C 2011/0395; B60C 2011/1209; B60C 2011/01; B60C 11/117; B60C 11/04
USPC .............................. 152/209.8, 209.18, 209.9
See application file for complete search history.

(56) References Cited

U.S. PATENT DOCUMENTS

| | | | |
|---|---|---|---|
| 2010/0051154 A1* | 3/2010 | Ebiko | B60C 11/0306 152/209.18 |
| 2010/0212792 A1* | 8/2010 | Mita | B60C 11/0306 152/209.9 |
| 2014/0224394 A1 | 8/2014 | Ochi et al. | |

FOREIGN PATENT DOCUMENTS

| | | |
|---|---|---|
| JP | 2013-139240 | 7/2013 |
| WO | WO 2013/046717 | 4/2013 |

OTHER PUBLICATIONS

JPH11342706A—Machine Translation (Google) (Year: 1999).*
International Search Report for International Application No. PCT/JP2014/062256 dated Jul. 22, 2014, 4 pages, Japan.

* cited by examiner

PNEUMATIC TIRE

TECHNICAL FIELD

The present technology relates to a pneumatic tire with improved steering stability performance on various road surfaces.

BACKGROUND

Technologies for improving steering stability performance on various road surfaces have been disclosed (for example, see Japanese Patent No. 4929466B). The technology disclosed in Patent Document 1 is a technology in which steering stability performance on the dry road surface and steering stability performance on the snow-covered road surface have been improved by defining and forming predetermined blocks and ribs on each of the vehicle mounting sides, and adjusting the groove area ratio.

In recent years, there is a demand that excellent steering stability performance be provided not only on the dry road surface and snow-covered road surface, but also on the wet road surface. It is not clear that controlling only the land portion shape and the groove area ratio can lead to an exhibit of excellent steering stability performance on each of the dry road surface, the snow-covered road surface, and the wet road surface, as in the technology disclosed in Japanese Patent No. 4929466B.

SUMMARY TECHNOLOGY

TECHNOLOGY The present technology provides a pneumatic tire that exhibits excellent steering stability performance on each of the dry road surface, the snow-covered road surface, and the wet road surface.

The pneumatic tire according to the present technology with a designated vehicle mounting direction includes at least four circumferential grooves, and a plurality of inclined grooves that communicate with the circumferential grooves. The circumferential grooves and the inclined grooves define and form a rib that includes a tire equatorial plane, and an outer block row located on the vehicle mounting outer side, and an inner lock row located on the vehicle mounting inner side. The block pitch length of the outer block row is greater than the block pitch length of the inner block row. The dimensions in the tire width direction of the regions interposed between two of the circumferential grooves are smaller in the order of the rib, the outer block row, and the inner block row. The inclined grooves that define and form the rib open only to the circumferential groove in the vehicle mounting inner side region that defines and forms the rib.

In the pneumatic tire according to the present technology, improvements have been made to the relationship between the block pitch lengths on the both vehicle mounting sides, the relationship between the dimensions in the tire width direction of the land portions arranged in series in the tire width direction, and the aspect of how the inclined grooves that form the rib extend. As a result, the pneumatic tire according to the present technology can exhibit excellent steering stability performance on each of the dry road surface, the snow-covered road surface, and the wet road surface.

DETAILED DESCRIPTION

Embodiments of the pneumatic tire according to the present technology (including Basic Mode and Additional Modes 1 to 13) will now be described based on the drawing. Note that these embodiments are not intended to limit the present technology. Furthermore, the constituents of the embodiments include constituents that can be easily replaced by those skilled in the art, and constituents that are substantially the same. In addition, those skilled in the art can combine the various modes included in the embodiments as desired within the range of obviousness.

<Basic Mode>

The following is a description of Basic Mode of the pneumatic tire according to the present embodiment. In the following description, "tire radial direction" refers to a direction orthogonal to the rotational axis of the pneumatic tire; "inner side in the tire radial direction" refers to a side that is near to the rotational axis in the tire radial direction; and "outer side in the tire radial direction" refers to a side that is far from the rotational axis in the tire radial direction. Furthermore, "tire circumferential direction" refers to a circumferential direction with the rotational axis as the center axis. Additionally, "tire width direction" refers to a direction parallel to the rotational axis; "inner side in the tire width direction" refers to a side that is near to a tire equatorial plane CL (tire equator line) in the tire width direction; and "outer side in the tire width direction" refers to a side that is far from the tire equatorial plane CL in the tire width direction. Note that "tire equatorial plane CL" refers to a plane that is orthogonal to the rotational axis of the pneumatic tire and that passes through the center of the tire width of the pneumatic tire.

Furthermore, in the present embodiment, the ground contact region of the pneumatic tire refers to a contact region of the tire surface that comes into contact with the road surface when the tire is fitted to an applicable rim, inflated to an air pressure of 200 to 250 kPa, and a load having 70 to 90% of the regular load is applied. A ground contact edge refers to the outermost position in the tire width direction of the ground contact region.

Here, the applicable rim refers to a "standard rim" prescribed by JATMA (Japan Automobile Tire Manufacturers Association), a "design rim" prescribed by TRA (Tire and Rim Association, Inc.), or a "measuring rim" prescribed by ETRTO (European Tyre and Rim Technical Organisation). "Regular load" refers to the "maximum load capacity" prescribed by JATMA, the maximum value in "TIRE LOAD LIMITS AT VARIOUS COLD INFLATION PRESSURES" prescribed by TRA, and "LOAD CAPACITY" prescribed by ETRTO.

Figure 1:
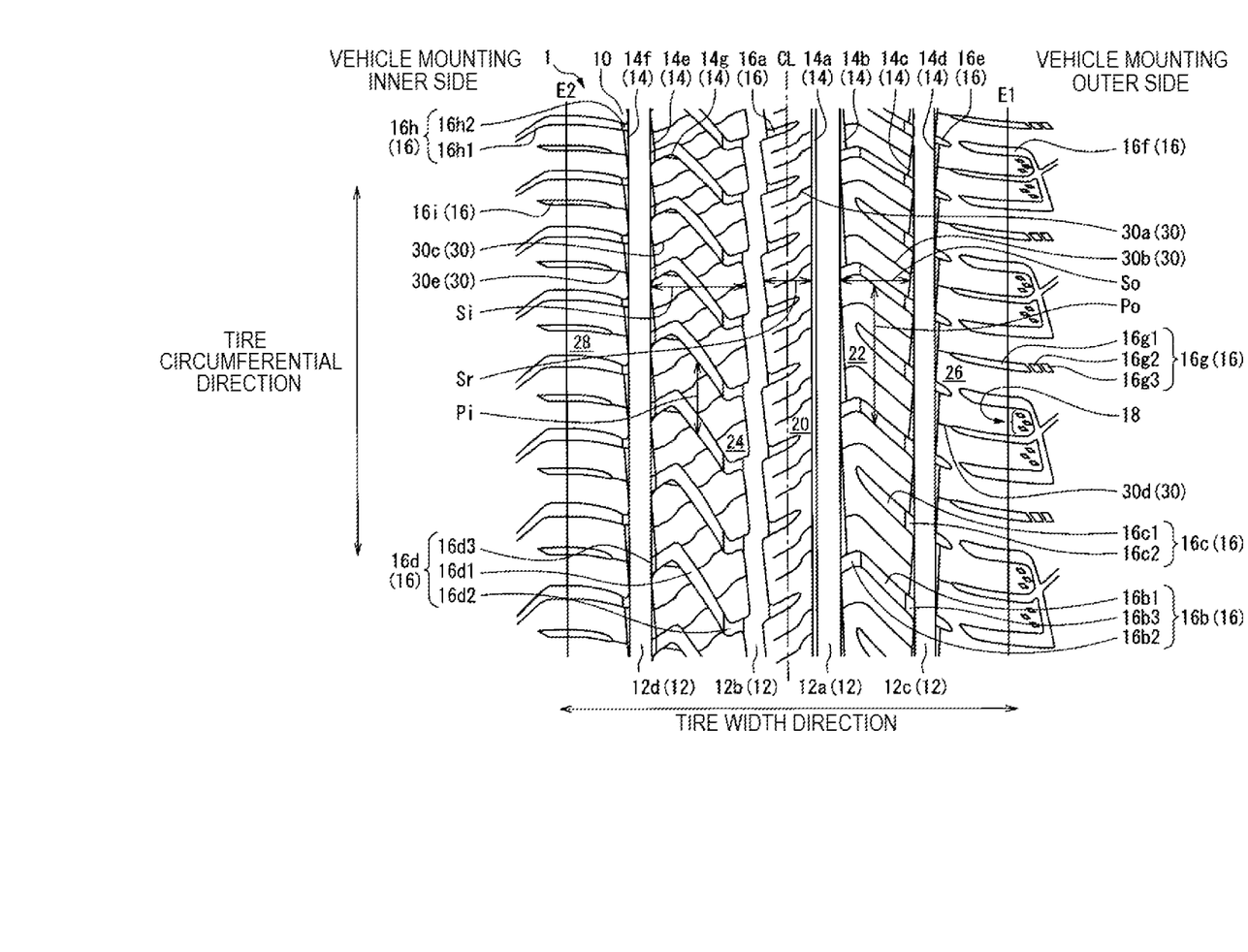
FIG. 1 is a plan view illustrating an example of the tread portion of the pneumatic tire according to an embodiment of the present technology.

FIG. 1 is a plan view illustrating an example of the tread portion of a pneumatic tire 1 according to an embodiment of the present technology. In the example illustrated in FIG. 1, a state in which the air pressure is 220 kPa and the applied load is 80% of the regular load is illustrated. The tread portion illustrated in FIG. 1 is formed from a rubber material (tread rubber) and exposed on the outermost side in the tire radial direction of the pneumatic tire 1, and a surface thereof constitutes a profile of the pneumatic tire 1. The surface of the tread portion forms a tread surface 10 that is a surface that comes into contact with the road surface when a vehicle (not illustrated) on which the pneumatic tire 1 is mounted is driven.

The pneumatic tire 1 having the tread surface 10 illustrated on FIG. 1 has a tread pattern in which the two sides in the tire width direction with the tire equatorial plane CL as an axis are asymmetrical, and a vehicle mounting direction is designated. In the pneumatic tire 1 illustrated on the drawing, the right side of the plane of the paper is the vehicle mounting outer side, and the left side of the plane of the paper is the vehicle mounting inner side. Hereinafter, the region on the vehicle mounting outer side (inner side) from the tire equatorial plane CL is referred to as the vehicle mounting outer (inner) side region in FIG. 1.

In the tread surface 10, at least four (four in the example illustrated in FIG. 1) grooves extending in the tire circumferential direction (hereinafter, sometimes referred to as "circumferential grooves") 12 (12a, 12b, 12c, 12d) are formed. Here, circumferential groove refers to a groove with a groove width of at least 2.0 mm and a groove depth of at least 5.0 mm.

The circumferential groove 12a extends linearly in the tire circumferential direction in the vehicle mounting outer side region. The circumferential groove 12a has chamfered portions 14a, 14b formed in the whole region in the tire circumferential direction on the inner side thereof in the tire width direction, and in predetermined regions in the tire circumferential direction on the outer side in the tire width direction, respectively. The circumferential groove 12b extends in a zigzag manner in the tire circumferential direction in the vehicle mounting inner side region. The circumferential groove 12c extends linearly in the tire circumferential direction in a region on the outer side of the circumferential groove 12a in the tire width direction, which is in the vehicle mounting outer side region. The circumferential groove 12c has chamfer portions 14c, 14d formed in respective predetermined regions in the tire circumferential direction on the both sides in the tire width direction. The circumferential groove 12d extends linearly in the tire circumferential direction in a region on the outer side of the circumferential groove 12b in the tire width direction, which is in the vehicle mounting inner side region. The circumferential groove 12d has chamfer portions 14e, 14f formed in respective predetermined regions in the tire circumferential direction on the both sides in the tire width direction. Note that in Basic Mode, whether the circumferential grooves 12a to 12d extend linearly or extend in a zigzag manner in the tire circumferential direction is an optional design matter.

Furthermore, a plurality (nine in the example illustrated on the drawing) of grooves that communicate with the circumferential grooves 12 (12a, 12b, 12c, 12d) and that are inclined with respect to the tire circumferential direction (including grooves extending in the tire width direction, hereinafter sometimes referred to as "inclined grooves") 16 (16a, 16b, 16c, 16d, 16e, 16f, 16g, 16h, 16i) are formed on the tread surface 10. Here, the inclined groove is a groove with a groove width of at least 2.0 mm and a groove depth of at least 5.0 mm. However, a raised bottom portion (raised bottom portion 16b2 and the like) in the inclined groove described later has a groove depth of at least 1.5 mm.

The inclined groove 16a extends from the inner side of the circumferential groove 12b in the tire width direction toward the vehicle mounting outer side, and terminates within a land portion. The inclined groove 16b is located between the circumferential grooves 12a, 12c, and is constituted by a deep groove portion 16b1 and raised bottom portions (shallow groove portions) 16b2, 16b3 adjacent thereto on each side in the tire width direction. The inclined groove 16b communicates with the circumferential grooves 12a, 12c via the raised bottom portions 16b2, 16b3 respectively. The inclined groove 16c is located between the circumferential grooves 12a, 12c as well as between inclined grooves 16b that are adjacent to each other in the tire circumferential direction, and is constituted by a deep groove portion 16c1 and a raised bottom portion (shallow groove portion) 16c2 adjacent thereto on the outer side in the tire width direction. The inclined grooves 16c communicates with the circumferential groove 12c via the raised bottom portion 16c2. The inclined groove 16d is located between the circumferential grooves 12b, 12d, and is constituted by a deep groove portion 16d1 and raised bottom portions (shallow groove portions) 16d2, 16d3 adjacent thereto on each side in the tire width direction. The inclined groove 16d communicates with the circumferential grooves 12b, 12d via the raised bottom portions 16d2, 16d3, respectively. In the example illustrated in FIG. 1, a chamfered portion 14g is formed adjacent to the deep groove portion 16d1 of the inclined groove 16d.

The inclined groove 16e extends from the outer side of the circumferential groove 12c in the tire width direction toward the outer side in the tire width direction along the extended line of one of the inclined grooves 16b, 16c, and terminates within the land portion. The inclined groove 16f is a rake-shaped groove having a width between the inclined grooves 16e adjacent to each other, and has the outer edge thereof in the tire width direction extending at least to a ground contact edge E1. The inclined groove 16g constituted by three constituents 16g1, 16g2, 16g3 arranged continuously in the tire width direction has both edges thereof terminating within the land portion on the outer side of the circumferential groove 12c in the tire width direction.

The inclined groove 16h is located on the outer side of the circumferential groove 12d in the tire width direction, and is constituted by a deep groove portion 16h1 and a raised bottom portion (shallow groove portion) 16h2 adjacent thereto on the inner side in the tire width direction. The inclined groove 16h communicates with the circumferential groove 12d via the raised bottom portion 16h2. The inclined groove 16i has both edges thereof terminating within the land portion on the outer side of the circumferential groove 12d in the tire width direction.

Note that the raised bottom portions 16b2, 16b3, 16c2, 16d2, 16d3, 16h2 and constituents on the outer side in the tire width direction of the circumferential grooves 12c, 12d located on the outermost side in the tire width direction (for example, the inclined grooves 16e to 16i) are only examples; therefore, they are not essential constituents in Basic Mode, but optional constituents.

The tread pattern of the pneumatic tire 1 illustrated in FIG. 1 is formed of the circumferential grooves 12, the chamfered portions 14, and the inclined grooves 16. Specifically, these grooves define and form a rib 20 including the tire equatorial plane CL, an outer block row 22 located on the vehicle mounting outer side of the rib 20, an inner block row 24 located on the vehicle mounting inner side of the rib 20, an outer shoulder rib 26 located on the outer side of the outer block row 22 in the tire width direction, and an inner shoulder block row 28 located on the outer side of the inner block row 24 in the tire width direction. Note that a plurality of sipes 30 (30a, 30b, 30c, 30d, 30e) are formed in the rib 20, the outer block row 22, the inner block row 24, the outer shoulder rib 26, and the inner shoulder block row 28, respectively, as illustrated in FIG. 1. Here, the sipe refers to a groove having a groove width of not less than 0.5 mm and not more than 1.5 mm and a groove depth of not less than 1.0 mm and not more than 10.0 mm.

With the above assumptions, in Basic Mode, a block pitch length Po of the outer block row 22 is greater than a block pitch length Pi of the inner block row 24 as illustrated in FIG. 1.

Furthermore, in Basic Mode, the dimensions in the tire width direction of the regions interposed between two grooves adjacent to each other out of the circumferential grooves 12a to 12d (hereinafter, sometimes referred to as "inter-circumferential groove region dimension") are smaller in the order of the rib 20, the outer block row 22, and the inner block row 24. In other words, the inter-circumferential groove region dimension Sr of the rib 20, the inter-circumferential groove region dimension So of the outer block row 22, and the inter-circumferential groove region dimension Si of the inner block row 24 satisfy Sr<So<Si. Here, the inter-circumferential groove region dimensions Sr, So, Si are the maximum dimension in the tire width direction between two circumferential grooves adjacent to each other, and do not include the chamfered portions 14.

In addition, in Basic Mode, the inclined grooves 16a defining and forming the rib 20 only opens to the circumferential groove 12b on the vehicle mounting inner side defining and forming the rib 20.

(Action and the Like)

In Basic Mode, the block pitch length Po of the outer block row 22 is longer than the block pitch length Pi of the inner block row 24 as illustrated in FIG. 1. Accordingly, the land portion stiffness of the vehicle mounting outer side region which easily affects the steering stability performance is increased, so it is possible to efficiently enhance the steering stability performance of the tire as a whole. As a result, it is possible to exhibit excellent steering stability performance on the dry road surface.

Furthermore, in Basic Mode, the inter-circumferential groove region dimensions Sr, So, Si are smaller in the order of the rib 20, the outer block row 22, and the inner block row 24 as illustrated in FIG. 1. Accordingly, the inter-circumferential groove region dimension Sr of the rib 20 is made to be smallest, in other words, the two circumferential grooves 12a, 12b defining and forming the rib 20 are brought to the center portion in the tire width direction which easily affects the water drainage performance, so that it is possible to enhance the water drainage performance. As a result, it is possible to quickly cut through a film of water on the road surface, and to reliably and stably bring the tire into contact with the road surface, so it is possible to exhibit excellent steering stability performance on the wet road surface in conjunction with improving the land portion stiffness of the vehicle mounting outer side region as described above.

By contrast, by making the inter-circumferential groove region dimension Si of the inner block row 24 to be largest, it is possible to sufficiently ensure, in particular, the edge component in the tire width direction of each of the blocks constituting the inner block row 24. As a result, the driving performance and the braking performance on the snow-covered road surface are enhanced, and it is possible to exhibit excellent steering stability performance on the snow-covered road surface.

In addition, in Basic Mode, the inclined groove 16a defining and forming the rib 20 is made only open to the circumferential groove 12b defining and forming the rib 20 in the vehicle mounting inner side region. Accordingly, by sufficiently ensuring the dimension of the inclined groove 16a in the tire width direction on the vehicle mounting inner side of the tire equatorial plane CL, it is possible to sufficiently ensure, in particular, the edge component in the tire width direction of the land portions defined and formed by the inclined grooves 16a. As a result, the driving performance and the braking performance on the snow-covered road surface are enhanced, and it is possible to exhibit excellent steering stability performance on the snow-covered road surface.

By contrast, by making the dimension of the inclined groove 16a in the tire width direction on the vehicle mounting outer side of the tire equatorial plane CL to be small (or zero), it is possible to sufficiently ensure the stiffness of the land portion. Accordingly, the land portion stiffness of the vehicle mounting outer side region which easily affects the steering stability performance is enhanced, so it is possible to efficiently enhance the steering stability performance of the tire as a whole. As a result, it is possible to exhibit excellent steering stability performance on the dry road surface.

As described above, in Basic Mode, improvements have been made to the relationship between the block pitch lengths on the both vehicle mounting sides, the relationship between the dimensions in the tire width direction of the land portions arranged in the tire width direction, and the aspect of how the inclined grooves forming the rib extend. Accordingly, the improvement in the steering stability performance on various road surfaces is applied efficiently to at least one of the vehicle mounting outer side region and the vehicle mounting inner side region, and the tread portion as a whole can exhibit a high level of steering stability performance on various road surfaces in either case.

Note that the pneumatic tire (not illustrated) according to Basic Mode as described above has the same meridian cross-section form as that of the conventional pneumatic tire. Here, the meridian cross-section form of the pneumatic tire refers to the cross-sectional shape of the pneumatic tire on a plane normal to the tire equatorial plane. The pneumatic tire according to Basic Mode includes a bead portion, a side wall portion, a shoulder portion, and the tread portion in that order from the inner side in the tire radial direction toward the outer side in a meridian cross-section view. Also, the pneumatic tire includes, for example, in a tire meridian cross-sectional view, a carcass layer that extends from the tread portion to the bead portions on both sides and is wound around a pair of bead cores, and a belt layer and a belt reinforcing layer formed in that order on the outer side of the carcass layer in the tire radial direction.

Furthermore, the pneumatic tire according to Basic Mode is obtained through each of the normal manufacturing steps including a step of mixing the tire materials, a step of processing the tire materials, a step of molding a green tire, a vulcanization step, an inspection step after vulcanization, and the like. When manufacturing the pneumatic tire according to Basic Mode, in particular, in the vulcanization step, the tread pattern is controlled using a mold so as to satisfy the predetermined conditions as described above regarding the relationship of the block pitch length on the both vehicle mounting sides, the relationship of the dimensions in the tire width direction of the land portions arranged in the tire width direction, and the aspect of how the inclined grooves forming the rib extend.

(Preferred Example of Basic Mode)

The ratio Po/Pi of the block pitch length Po of the outer block row 22 and the block pitch length Pi of the inner block row 24 may be from not less than 1.3 to not more than 8.0. By making the ratio Po/Pi not less than 1.3, the land portion stiffness of the vehicle mounting outer side region which easily affects the steering stability performance is sufficiently enhanced, and it is possible to more efficiently enhance the steering stability performance of the tire as a whole. As a result, it is possible to further improve the steering stability performance on the dry road surface. Furthermore, by making the ratio Po/Pi not more than 8.0, it is possible to suppress the reduction in the performance regarding uniformity and the reduction in the uneven wear resistance performance, without an excessive difference in land portion stiffness on the both vehicle mounting sides. Note that by making the ratio Po/Pi not more than 4.0, it is possible to exhibit the above affect at an even higher level.

Furthermore, the ratio So/Sr of the inter-circumferential groove region dimension So of the outer block row 22 and the inter-circumferential groove region dimension Sr of the rib 20 may be from not less than 1.1 to not more than 3.0. By making the ratio So/Sr not less than 1.1, the land portion stiffness is sufficiently enhanced in the vehicle mounting outer side region which easily affects the steering stability performance, specifically in the region in the tire width direction interposed between the circumferential grooves 12a, 12c, so it is possible to efficiently enhance the steering stability performance of the tire as a whole. As a result, it is possible to further improve the steering stability performance on the dry road surface. Furthermore, by making the ratio So/Sr not more than 3.0, it is possible to sufficiently ensure the region on the outer side of the circumferential groove 12c in the tire width direction, in other words the dimension of the outer shoulder rib 26 in the tire width direction, without an excessive inter-circumferential groove region dimension So of the outer block row 22. As a result, it is possible to sufficiently ensure the edge component of the outer shoulder rib 26 in the tire width direction, to efficiently enhance the driving performance and the braking performance on the snow-covered road surface, and to further improve the steering stability performance on the snow-covered road surface.

In addition, the ratio Si/Sr of the inter-circumferential groove region dimension Si of the inner block row 24 and the inter-circumferential groove region dimension Sr of the rib 20 may be from not less than 1.1 to not more than 4.0. By making the ratio Si/Sr not less than 1.1, it is possible to sufficiently enhance the land portion stiffness of the region in the tire width direction interposed between the circumferential grooves 12b, 12d, and to further enhance the steering stability performance of the tire as a whole. As a result, it is possible to still further improve the steering stability performance on the dry road surface. Furthermore, by making the ratio Si/Sr not more than 4.0, it is possible to sufficiently ensure, in particular, the region on the outer side of the circumferential groove 12d in the tire width direction, in other words, the dimension of the inner shoulder block row 28 in the tire width direction, without an excessive inter-circumferential groove region dimension Si of the inner block row 24. As a result, it is possible to sufficiently ensure the edge component of the inner shoulder block row 28 in the tire width direction, to enhance the driving performance and braking performance on the snow-covered road surface, and to further improve the steering stability performance on the snow-covered road surface.

In addition, the inclined groove 16a defining and forming the rib 20 may be extended across the tire equatorial plane CL into the vehicle mounting outer side region, and not just the vehicle mounting inner side region. By extending the inclined groove 16a into the vehicle mounting outer side, it is possible to ensure, in particular, a longer edge component of the rib 20 in the tire width direction. As a result, it is possible to further enhance the driving performance and the braking performance on the snow-covered road surface, and to further improve the steering stability performance on the snow-covered road surface.

<Additional Mode>

Next, descriptions are made of Additional Modes 1 to 13 which can be optionally implemented as opposed to Basic Mode of the pneumatic tire according to the present technology described above.

(Additional Mode 1)

In Basic Mode, as illustrated in FIG. 1, preferably the inclined grooves 16b, 16c defining and forming the outer block row 22 and the inclined grooves 16d defining and forming the inner block row 24 become wider toward the outer side in the tire width direction (Additional Mode 1).

By widening the inclined grooves 16b, 16c, 16d defining and forming the so-called second block row (outer block row 22, inner block row 24) toward the outer side in the tire width direction which is the downstream side when the flow of water is envisaged, it is possible to further improve the water drainage performance.

(Additional Mode 2)

In Basic Mode and a mode in which Additional Mode 1 has been incorporated into Basic Mode, in FIG. 1, in the region from the circumferential groove 12c on the vehicle mounting outermost side to the circumferential groove 12d on the vehicle mounting innermost side, the sum total of the periphery length L1 of the inclined grooves in the vehicle mounting inner side region is greater than the sum total of the periphery length L2 of the inclined grooves in the vehicle mounting outer side region (Additional Mode 2).

Here, in the example illustrated in FIG. 1, the sum total of the periphery length L1 of the inclined grooves in the vehicle mounting inner side region is the sum total of the length of extension of the inclined grooves (including portions of the inclined grooves 16a and all the inclined grooves 16d) in the region from the tire equatorial plane CL to the circumferential groove 12d on the outermost side in the tire width direction in the vehicle mounting inner side region. Furthermore, in the description below, the length of extension of a groove (sipe) is a length of the center line of the groove (sipe) in the width direction.

Furthermore, in the example illustrated in FIG. 1, the sum total of the periphery length L2 of the inclined grooves in the vehicle mounting outer side region is the sum total of the length of extension of the inclined grooves (including portions of the inclined grooves 16a, all the inclined grooves 16b, and all the inclined grooves 16c) in the region from the tire equatorial plane CL to the circumferential groove 12c on the outermost side in the tire width direction in the vehicle mounting outer side region.

By making the sum total of the periphery length L1 greater than the sum total of the periphery length L2, it is possible to further enhance the land portion stiffness of the vehicle mounting outer side region which easily affects the steering stability performance, without excessively increasing the sum total of the periphery length L2. Accordingly, it is possible to further efficiently improve the steering stability performance on the dry road surface. Furthermore, by sufficiently ensuring, in particular, the edge component in the tire width direction of each land portion constituting the rib 20 and the inner block row 24 in the vehicle mounting inner side region, without excessively reducing the sum total of the periphery length L1, it is possible to further improve the steering stability performance on the snow-covered road surface.

(Preferred Example of Additional Mode 2)

The ratio L2/L1 of the sum total of the periphery length L2 of the inclined grooves in the vehicle mounting outer side region and the sum total of the periphery length L1 of the inclined grooves in the vehicle mounting inner side region may be from not less than 0.3 to not more than 0.9. By making the ratio L2/L1 not less than 0.3, the stiffness of the rib 20 and the inner block row 24 is sufficiently ensured without excessively many inclined grooves being formed in the vehicle mounting inner side region, so it is possible to further improve the steering stability performance on the dry road surface. Furthermore, by making the ratio L2/L1 not less than 0.3, particularly the edge component of the outer block row 22 in the tire width direction is sufficiently ensured without excessively few inclined grooves being formed in the vehicle mounting outer side region, so it is possible to further improve the steering stability performance on the snow-covered road surface.

Furthermore, as described above, by making the ratio L2/L1 not more than 0.9, it is possible to achieve the improvement in the steering stability performance on the dry road surface in the vehicle mounting outer side region and the improvement in the steering stability performance on the snow-covered road surface in the vehicle mounting inner side region at an even higher level.

(Additional Mode 3)

In Basic Mode and in a mode in which at least one of Additional Modes 1, 2 has been incorporated into Basic Mode, it is preferable that at least one of the inclined grooves defining and forming the outer block row 22, which is the inclined groove 16$b$ in the example illustrated in FIG. 1, and at least one of the inclined grooves defining and forming the inner block row 24, which is the inclined groove 16$d$ in the example illustrated in FIG. 1, each have at least one bent portion, and the number of bent portions within the inner block row 24 be greater than the number of bent portions within the outer block row 22 (Additional Mode 3).

As illustrated in FIG. 1, by making the inclined grooves 16$b$, 16$d$ include at least one bent portion, it is possible to provide not only edge component in the tire width direction but also edge component in the tire circumferential direction in the land portions constituting the outer block row 22 and the inner block row 24. As a result, it is possible not only to sufficiently ensure the driving performance and braking performance on the snow-covered road surface due to the edge component in the tire width direction, but also to improve the turning performance on the snow-covered road surface due to the edge component in the tire circumferential direction, and therefore to further enhance the steering stability performance on the snow-covered road surface.

Furthermore, by making the number of bent portions within the inner block row 24 greater than the number of bent portions within the outer block row 22, it is possible to efficiently cause the inner block row 24 which has a comparatively long dimension in the tire width direction to include more bent portions, in other words without excessively reducing the stiffness of the land portions. As a result, it is possible to sufficiently ensure the edge component in the tire width direction and the edge component in the tire circumferential direction of the land portions, and to further improve the steering stability performance on the snow-covered road surface.

(Preferred Example of Additional Mode 3)

The bend angle of the bent portions described above may be from not less than 50° to not more than 150°. By making the bend angle described above not less than 50°, it is possible to sufficiently ensure the edge component in the tire width direction of the land portions, and to enhance the driving performance and braking performance on the snow-covered road surface. Furthermore, by making the bend angle described above not more than 150°, it is possible to sufficiently ensure the edge component in the tire circumferential direction of the land portions, and to enhance the turning performance on the snow-covered road surface.

Furthermore, when the bent portions described above are formed either within the inner block row 24 or within the outer block row 22, the bent portions may be formed on the inner side in the tire width direction of the center position of the block rows 24, 22 in the tire width direction. Here, forming the bent portions on the inner side in the tire width direction of the center position in the tire width direction described above refers to forming the bent portions so that the apexes of the bent portions are positioned on the inner side in the tire width direction of the center line of each of the block rows 24, 22 in the tire width direction.

By forming the bent portions described above on the inner side in the tire width direction of the center position of each of the block rows 24, 22 in the tire width direction, it is highly likely that straight inclined grooves will be present on the outer side portion in the tire width direction of the region of each of the block rows 24, 22 in the tire width direction. Therefore, it is highly likely that the inclined grooves become straight on the outer side portion in the tire width direction, which is on the downstream side when the flow of water is envisaged, in both the vehicle mounting outer side region and the vehicle mounting inner side region, thereby enabling the water drainage performance to be further improved. By making the apexes of the bent portions described above in the one-third portion on the inner side in the tire width direction of the region of each of the block rows 24, 22 in the tire width direction, the above effect can be exhibited at an even higher level.

(Additional Mode 4)

In Basic Mode and a mode in which at least one of Additional Modes 1 to 3 has been incorporated into Basic Mode, it is preferable that at least one of the inclined grooves defining and forming the outer block row 22, which is the inclined groove 16$b$ in the example illustrated in FIG. 1, and at least one of the inclined grooves defining and forming the inner block row 24, which is the inclined groove 16$d$ in the example illustrated in FIG. 1, include the raised bottom portion 16$b$2, 16$d$2 in portions adjacent to the circumferential groove 12$a$, 12$b$ on the inner side in the tire width direction, respectively (Additional Mode 4).

By making the inclined grooves 16$b$, 16$d$ include the raised bottom portions 16$b$2, 16$d$2, it is possible to cause the water that passes over the raised bottom portions 16$b$2, 16$d$2 from the circumferential grooves 12$a$, 12$b$ to the outer side in the tire width direction to flow vigorously into the deep groove portions 16$b$1, 16$d$1. As a result, it is possible to stabilize the flow of water from the circumferential grooves 12$a$, 12$b$ on the upstream side into the deep groove portions 16$b$1, 16$d$1 on the downstream side via the raised bottom portions 16$b$2, 16$d$2, so it is possible to improve the water drainage performance.

(Preferred Example of Additional Mode 4)

The groove depth of the raised bottom portions 16$b$2, 16$d$2 may be from not less than 10% to not more than 50% of the groove depth of the deep groove portions 16$b$1, 16$d$1. By making the groove depth of the raised bottom portions 16$b$2, 16$d$2 not less than 10% of the groove depth of the deep groove portions 16$b$1, 16$d$1, it is possible to cause the water to reliably pass over the raised bottom portions 16$b$2, 16$d$2 from the circumferential grooves 12$a$, 12$b$ and to stably flow into the deep groove portions 16b1, 16d1. As a result, the effect of the communications of the circumferential grooves 12a, 12b with the deep groove portions 16b1, 16d1 can be made effective.

Furthermore, by making the groove depth of the raised bottom portions 16b2, 16d2 not more than 50% of the groove depth of the deep groove portions 16b1, 16d1, sufficient difference in level between the deep groove portions 16b1, 16d1 and the raised bottom portions 16b2, 16d2 is ensured, and the flow velocity of water flowing from the raised bottom portions 16b2, 16d2 into the deep groove portions 16b1, 16d1 is increased, so it is possible to further improve the water drainage performance.

(Additional Mode 5)

In Basic Mode and a mode in which at least one of Additional Modes 1 to 4 has been incorporated into Basic Mode, as illustrated in FIG. 1, it is preferable that at least one of the circumferential grooves in the vehicle mounting inner side region (the circumferential groove 12b in the example illustrated in FIG. 1) include at least one bent portion (Additional Mode 5).

By providing at least one bent portion in at least one of the circumferential grooves in the vehicle mounting inner side region (the circumferential groove 12b in the example illustrated in FIG. 1), the land portions defined and formed by the circumferential groove 12b having the bent portion have not only the edge component in the tire circumferential direction, but also the edge component in the tire width direction. Accordingly, it is possible to enhance the driving performance and braking performance on the snow-covered road surface compared to the case where the bent portion is not provided, and therefore it is possible to further improve the steering stability performance on the snow-covered road surface.

(Additional Mode 6)

In Basic Mode and a mode in which at least one of Additional Modes 1 to 5 has been incorporated into Basic Mode, as illustrated in FIG. 1, it is preferable that, in the region from the circumferential groove 12c on the vehicle mounting outermost side to the circumferential groove 12d on the vehicle mounting innermost side, the sum total of the periphery length L3 of the sipes in the vehicle mounting inner side region be greater than the sum total of the periphery length L4 of the sipes in the vehicle mounting outer side region (Additional Mode 6).

Here, the sum total of the periphery length L3 of the sipes in the vehicle mounting inner side region is the sum total of the length of extension of the sipes (including portions of the sipes 30a, and all of the sipes 30c) that are present in the region from the tire equatorial plane CL to the circumferential groove 12d on the outermost side of the vehicle mounting inner side region in the tire width direction, as illustrated in FIG. 1.

Furthermore, the sum total of the periphery length L4 of sipes in the vehicle mounting outer side region is the sum total of the length of extension of the sipes (including portions of the sipes 30a, and all of the sipes 30b) that are present in the region from the tire equatorial plane CL to the circumferential groove 12c on the outermost side of the vehicle mounting outer side region in the tire width direction, as illustrated in FIG. 1.

By making the sum total L3 greater than the sum total L4, the land portion stiffness of the vehicle mounting outer side region which easily affects the steering stability performance is enhanced without sipes being excessively formed, so it is possible to further efficiently improve the steering stability performance on the dry road surface. Furthermore, by ensuring, in particular, greater edge component in the tire width direction of each of the land portions constituting the rib 20 and the inner block row 24 in the vehicle mounting inner side region, it is possible to further improve the steering stability performance on the snow-covered road surface.

(Preferred Example of Additional Mode 6)

The ratio L4/L3 of the sum total of the periphery length L4 of the sipes in the vehicle mounting outer side region and the sum total of the periphery length L3 of the sipes in the vehicle mounting inner side region may be from not less than 0.2 to not more than 0.9. By making the ratio L4/L3 not less than 0.2, the stiffness of the land portions (rib 20 and inner block row 24) having the sipes 30a, 30c formed therein is enhanced without sipes being excessively formed in the vehicle mounting inner side, so it is possible to suppress the reduction in steering stability performance the on dry road surface. Furthermore, by making the ratio L4/L3 not less than 0.2, particularly the sufficient edge component in the tire width direction of each of the land portions is ensured without excessively few sipes being formed in the vehicle mounting outer side region, so it is possible to further improve the steering stability performance on the snow-covered road surface.

Furthermore, by making the ratio L4/L3 not more than 0.9, it is possible to further efficiently achieve the improvement in the steering stability performance on the dry road surface in the vehicle mounting outer side region and the improvement in the steering stability performance on the snow-covered road surface in the vehicle mounting inner side region.

(Additional Mode 7)

In the Basic Mode and in a mode in which at least one of Additional Modes 1 to 6 has been incorporated into Basic Mode, as illustrated in FIG. 1, it is preferable that, in the region from the circumferential groove 12c on the vehicle mounting outermost side to the ground contact edge E1 on the vehicle mounting outer side, another inclined groove 16f be formed along the extended line of a specific inclined groove 16e via the land portion, and in the region from the circumferential groove 12d on the vehicle mounting innermost side to the ground contact edge E2 on the vehicle mounting inner side, a specific inclined groove 16h be formed over the whole region in the tire width direction (Additional Mode 7).

In the region from the circumferential groove 12c on the vehicle mounting outermost side to the ground contact edge E1 on the vehicle mounting outer side, by forming another inclined groove 16f along the extended line of a specific inclined groove 16e via the land portion, it is possible to define and form a rib base land portion on the outer side of the circumferential groove 12c in the tire width direction. As a result, the land portion stiffness of the vehicle mounting outer side region which easily affects the steering stability performance is efficiently enhanced, so it is possible to further improve the steering stability performance on the dry road surface.

Furthermore, in the region from the circumferential groove 12d on the vehicle mounting innermost side to the ground contact edge E2 on the vehicle mounting inner side, by forming a specific inclined groove 16h in the whole region in the tire width direction, it is possible to provide a greater edge component in the tire width direction in a land portion defined and formed by the inclined groove 16h. As a result, the gripping force can be efficiently obtained on the snow-covered road surface, and it is possible to further improve the steering stability performance on the snow-covered road surface.

(Preferred Example of Additional Mode 7)

The land portion interposed in the region in the tire width direction between the specific inclined groove 16e and the other inclined groove 16f formed along the extended line thereof as illustrated in FIG. 1 may exist within the region in the tire width direction from the circumferential groove 12c to the ground contact edge E1 in a position from 10% to 60% on the circumferential groove 12c side. Here, the center position in the tire width direction of the land portion refers to the center position in the tire width direction between the position on the outermost side in the tire width direction of the inclined groove 16e and the position on the innermost side in the tire width direction of the portion of the inclined groove 16f located on the extension line of the inclined groove 16e.

By positioning the center position in the tire width direction of the land portion in the region from the circumferential groove 12c to the ground contact edge E1 on the outer side in the tire width direction from the position 10% on the circumferential groove 12c side, it is possible to form to a certain extent the inclined groove 16e extending in the tire width direction in the portion close to the circumferential groove 12c. Accordingly, the effect of the edge component in the tire width direction (improvement in driving performance and braking performance on the snow-covered road surface), which cannot be exhibited only by the circumferential groove 12c, is exhibited even by a portion close to the circumferential groove 12c, so it is possible to improve the steering stability performance on the snow-covered road surface.

Furthermore, by positioning the center position in the tire width direction of the land portion in the region from the circumferential groove 12c to the ground contact edge E1 on the inner side in the tire width direction from the position 60% on the circumferential groove 12c side, it is possible to sufficiently ensure the length in the tire width direction of the inclined groove 16f in the region close to the ground contact edge E1. Accordingly, the length of the inclined groove 16f in the tire width direction in the region close to the ground contact edge E1 is sufficiently ensured, so it is possible to suppress the reduction in water drainage performance by forming the land portion between the inclined groove 16e and the inclined groove 16f.

In addition, the inclined grooves 16g, 16i may be formed terminating in the land portion without communicating with the circumferential grooves 12c, 12d in at least one of the outer side shoulder rib 26 and the inner shoulder block row 28. By forming the inclined grooves 16g, 16i, it is possible to make at least one of the outer shoulder rib 26 and the inner shoulder block row 28 have still more edge component of the land portions in the tire width direction, so it is possible to further improve the steering stability performance on the snow-covered road surface.

(Additional Mode 8)

In Basic Mode and a mode in which at least one of Additional Modes 1 to 7 has been incorporated into Basic Mode, it is preferable that the sum total of the area A1 of the circumferential grooves in the vehicle mounting outer side region be greater than the sum total of the area A2 of the circumferential grooves in the vehicle mounting inner side region (Additional Mode 8). Note that, in the following description, the area of a groove is an area in plan view when the pneumatic tire is fitted to the applicable rim and inflated to the regular inner pressure in an unloaded state, and the area does not include the chamfered portions 14.

In Basic Mode, the pitch length Po of the outer block row 22 is greater than the pitch length Pi of the inner block row 24, and the inter-circumferential groove region dimension So of the outer block row 22 is smaller than the inter-circumferential groove region dimension Si of the inner block row 24, and in addition the inclined groove 16a only opens to the circumferential groove 12b in the vehicle mounting inner side region. In other words, in Basic Mode, the possibility is high that the sum total of the areas of the inclined grooves 16a, 16b, 16c, 16d formed in the region in the tire width direction from the circumferential groove 12c to the circumferential groove 12d is greater in the vehicle mounting inner side region than in the vehicle mounting outer side region.

Therefore, in Additional Mode 8, for the circumferential grooves, the sum total A1 is greater than the sum total A2, and for the circumferential grooves, the size relationship for the sum total of the area in the vehicle mounting outer side region and the sum total of the area in the vehicle mounting inner side region is the reverse of the size relationship for the inclined grooves. Accordingly, the groove area ratio (the ratio of the groove area to the sum total of the land portion area and the groove area) is more uniform in the both vehicle mounting sides for the tire as a whole, and therefore the performance regarding uniformity and the uneven wear resistance performance can be improved.

(Preferred Example of Additional Mode 8)

A percentage $[(A1-A2)/A2] \times 100$ of the difference between the sum total of the area A1 of the circumferential grooves in the vehicle mounting outer side region and the sum total of the area A2 of the circumferential grooves in the vehicle mounting inner side region with respect to the sum total of the area A2 of the circumferential grooves in the vehicle mounting inner side region may be from not less than 1% to not more than 15%.

By making the above percentage not less than 1%, it is possible to make the sum total of the area A1 of the circumferential grooves on the vehicle mounting outer side where the arrangement density of the inclined grooves is comparatively small sufficiently larger than the sum total of the area A2 of the circumferential grooves on the vehicle mounting inner side where the arrangement density of the inclined grooves is comparatively large. Accordingly, it is also possible to sufficiently ensure the groove area even on the vehicle mounting outer side on which the ground contact region is comparatively increased when turning; thus, it is, in particular, possible to enhance the water drainage performance when turning.

Furthermore, by making the above percentage not more than 15%, it is possible to prevent the sum totals of the areas A1, A2 of the circumferential grooves from being excessively different from each other on the both vehicle mounting sides. Accordingly, the groove area ratio is more uniform on the both vehicle mounting sides for the tire as a whole, and therefore the performance regarding uniformity and the uneven wear resistance performance can be further improved.

Furthermore, the percentage of the groove area (groove area percentage) to the sum total of the groove area and the land portion area in regions in the tire width direction from the ground contact edge E1 to the ground contact edge E2 may be from not less than 30% to not more than 40%.

By making the percentage of the groove area not less than 30%, it is possible to ensure sufficient groove area and to further improve the water drainage performance, and to have greater edge on the land portions thereby increasing the driving performance and braking performance on the snow-covered road surface, and therefore it is possible to further improve the steering stability performance on the snow-covered road surface.

Furthermore, by making the percentage of the groove area not more than 40%, the stiffness of the land portions is sufficiently ensured without the groove being excessively increased, so it is possible to further improve the steering stability performance on the dry road surface.

(Additional Mode 9)

In Basic Mode and a mode in which at least one of Additional Modes 1 to 8 has been incorporated into Basic Mode, it is preferable that the sum total of the area A3 of the inclined grooves on the vehicle mounting inner side be greater than the sum total of the area A4 of the inclined grooves on the vehicle mounting outer side (Additional Mode 9).

As described above, in Basic Mode, the possibility is high that the sum total of the areas of the inclined grooves 16a, 16b, 16c, 16d formed in the region in the tire width direction from the circumferential groove 12c to the circumferential groove 12d is greater in the vehicle mounting inner side region than in the vehicle mounting outer side region. In contrast, in Additional Mode 9, the sum total of the area of the inclined grooves 16a to 16i in a region that is further expanded in the tire width direction, in other words, in the region in the tire width direction from the ground contact edge E1 to the ground contact edge E2, is greater in the vehicle mounting inner side region than the vehicle mounting outer side region.

Accordingly, overall between the ground contact edges E1, E2, the sum total of the area A4 of the inclined grooves in the vehicle mounting outer side region which easily affects the steering stability performance is comparatively reduced to increase the land portion stiffness, and therefore it is possible to further efficiently improve the steering stability performance on the dry road surface.

Furthermore, the sum total of the area A3 of the inclined grooves in the vehicle mounting inner side region is comparatively increased to sufficiently ensure the groove area, so it is possible to cause the land portions to have a large number of edges and to further improve the steering stability performance on the snow-covered road surface.

(Preferred Example of Additional Mode 9)

A percentage [(A3−A4)/A4]×100% of the difference between the sum total of the area A3 of the inclined grooves in the vehicle mounting inner side region and the sum total of the area A4 of the inclined grooves in the vehicle mounting outer side region with respect to the sum total of the area A4 of the inclined grooves in the vehicle mounting outer side region may be from not less than 1% to not more than 15%.

By making the above percentage not less than 1%, in the whole ground contact region, it is possible to sufficiently form the inclined grooves on the vehicle mounting inner side to ensure a sufficient groove area, thereby further improving the water drainage performance, and to make the land portions have a lot of the edge component in the tire width direction, thereby further improving the steering stability performance on the snow-covered road surface.

Furthermore, by making the above percentage not more than 15%, it is possible to further improve the performance regarding uniformity and the uneven wear resistance without the sum total of the area of the inclined grooves excessively varying between the both vehicle mounting sides.

Furthermore, for all grooves (excluding sipes) formed in the region in the tire width direction between the ground contact edge E1 and the ground contact edge E2 illustrated in FIG. 1, the difference in groove area percentage between the grooves formed in the vehicle mounting outer side and the grooves formed in the vehicle mounting inner side may be ±5%.

By making the difference in the groove area percentage described above ±5%, it is possible to further improve the performance regarding uniformity and the uneven wear resistance without the sum total of the area of the circumferential grooves and the inclined grooves excessively varying on the both vehicle mounting sides.

Furthermore, similar to Additional Mode 8, the percentage of the groove area (groove area percentage) to the sum total of the groove area and the land portion area in regions in the tire width direction from the ground contact edge E1 to the ground contact edge E2 may be from not less than 30% to not more than 40%.

By making the groove area percentage not less than 30%, as described above, it is possible to further improve the water drainage performance and the steering stability performance on the snow-covered road surface, and by making the groove area percentage not more than 40%, as described above, it is possible to further improve the steering stability performance on the dry road surface.

(Additional Mode 10)

In Basic Mode and in a mode in which any one of Additional Modes 1 to 9 has been incorporated into Basic Mode, as illustrated in FIG. 1, it is preferable that the inclined groove 16a arranged in the rib 20 extends from the circumferential groove 12b on the vehicle mounting inner side passing over the tire equatorial plane CL toward the vehicle mounting outer side and terminates in the land portion (Additional Mode 10).

By extending the inclined groove 16a illustrated in FIG. 1 from the circumferential groove 12b on the vehicle mounting inner side so as to pass over the tire equatorial plane CL toward the vehicle mounting outer side and to terminate in the land portion, the total length of the inclined groove 16a can be increased. Accordingly, because it is possible to increase both the edge component in the tire circumferential direction and the edge component in the tire width direction of the land portions defined and formed by the inclined groove 16a, so it is possible to further improve the steering stability performance on the snow-covered road surface.

(Additional Mode 11)

In Basic Mode or a mode in which any one of Additional Modes 1 to 10 has been incorporated into Basic Mode, as illustrated in FIG. 1, on both sides in the tire width direction of the circumferential groove 12b on the vehicle mounting inner side defining and forming the rib 20, it is preferable that at least the communicating portions of the inclined grooves 16a, 16d that communicate with the circumferential groove 12b extend to the same side in the tire circumferential direction (the top side of the plane of the paper in the case illustrated in FIG. 1) from the vehicle mounting inner side toward the vehicle mounting outer side (Additional Mode 11). Here, the communicating portion described above refers to portions of the inclined grooves 16a, 16d each closest to the circumferential groove 12b, and extending to the same side in the tire circumferential direction from the vehicle mounting inner side to the outer side.

On both sides in the tire width direction of the circumferential groove 12b on the vehicle mounting inner side, by extending the communicating portions to the same side in the tire circumferential direction from the vehicle mounting inner side toward the vehicle mounting outer side, it is possible to enhance the water drainage characteristics between these communicating portions that straddle the circumferential groove 12b in particular, so it is possible to further improve the steering stability performance on the wet road surface.

(Additional Mode 12)

In Basic Mode or a mode in which any one of Additional Modes 1 to 11 has been incorporated into Basic Mode, as illustrated in FIG. 1, it is preferable that the longest extending portion of the inclined groove 16d arranged in the inner block row 24 and the longest extending portion of the inclined groove 16b arranged in the outer block row 22 extend to the same side in the tire circumferential direction (the bottom side of the plane of the paper in the case illustrated in FIG. 1) from the vehicle mounting inner side toward the vehicle mounting outer side (Additional Mode 12). Here, the longest extending portions of the inclined grooves 16b, 16d refer to portions with the maximum dimension in the tire width direction of those portions that extend to the same side in the tire circumferential direction from the vehicle mounting inner side toward the outer side.

By extending the longest extending portions of the inclined grooves 16d, 16b to the same side in the tire circumferential direction from the vehicle mounting inner side toward the outer side, in tires in which the rotating direction is not designated, the inclined grooves 16d, 16b will extend in the same direction before and after changing the mounting aspect. Therefore, in particular for tires in which the rotating direction is not designated, it is possible to suppress any excessive variation in the water drainage performance before and after changing the mounting aspect, so it is possible to further improve the steering stability performance on the wet road surface. Furthermore, according to the extension aspect of the longest extending portions of the inclined grooves 16d, 16b, it is possible to suppress any excessive variation in the grip edge direction before and after changing the mounting aspect and to further improve the steering stability performance on the snow-covered road surface.

(Additional Mode 13)

In Basic Mode and a mode in which any one of Additional Modes 1 to 12 has been incorporated into Basic Mode, as illustrated in FIG. 1, it is preferable that the ground contact portions of the inclined grooves 16f, 16g that are arranged on the outer side in the tire width direction of the circumferential groove 12c on the vehicle mounting outermost side and the ground contact portions of the inclined grooves 16h, 16i that are arranged on the outer side in the tire width direction of the circumferential groove 12d on the vehicle mounting innermost side are arranged forming an angle not less than 50° and less than 90° in the counterclockwise direction relative to the tire circumferential direction (Additional Mode 13).

In other words, in the example illustrated in FIG. 1, on the vehicle mounting outer side, the ground contact portions of the three prong portions of the rake-shaped inclined groove 16f and the ground contact portion of a portion 16g1 of the inclined groove 16g extend forming an angle not less than 50° and less than 90° in the counterclockwise direction relative to the tire circumferential direction (from the left upper side to the right lower side in FIG. 1). Similarly, on the vehicle mounting inner side, each of the ground contact portions of the inclined grooves 16h, 16i extends forming an angle not less than 50° and less than 90° in the counterclockwise direction relative to the tire circumferential direction (from the left upper side to the right lower side of FIG. 1).

According to the above structure of the inclined grooves 16f, 16g, 16h, 16i, when the tire is rotating (moving forward), first a lateral force acts on the tire along the tire width direction. Next, this lateral force generates a longitudinal force along the tire circumferential direction that depends on the shape of the land portions constituting the tread portion. The result of the lateral force and the longitudinal force acting together produces a rotating moment in the counterclockwise direction on the tire, in the example illustrated in FIG. 1. Therefore, the pneumatic tire having the inclined grooves 16f, 16g, 16h, 16i according to this embodiment rotates counterclockwise in plan view when rotating, so the vehicle itself deviates to the left side in the travel direction.

Normally, a gentle slope is provided on the road surface from the center side in the width direction toward the road shoulder sides, so by making the road shoulder sides lower compared to the center side, drainage of rainwater and the like is promoted. For example, when driving on the right side is adopted as in the United States of America, the road shoulder is on the right side in the travel direction of the vehicle, so the vehicle tends to deviate to the right side while the vehicle is traveling.

In the present embodiment, the inclined grooves 16f, 16g, 16h, 16i described above are adopted, so on road surfaces where driving is on the right side, the deviation of the vehicle to the right side while the vehicle is traveling can be deliberately canceled out by the deviation to the left side in the travel direction of the vehicle itself as described above. As a result, according to the pneumatic tire of the present embodiment, in particular on road surfaces where driving is on the right side, it is possible to further enhance the steering stability performance on various road surfaces (the dry road surface, the snow-covered road surface, and the wet road surface).

Note that, by making the ground contact portions of the specific inclined grooves described above form an angle less than 90° in the counterclockwise direction relative to the tire circumferential direction, the above results can be obtained, but to obtain this effect at an even higher level, preferably the angle is not more than 87°, and more preferably is not more than 85°.

Furthermore, by making the ground contact portions of the specific inclined grooves described above form an angle not less than 50° in the counterclockwise direction relative to the tire circumferential direction, it is possible to suppress excessive increase in the region in the tire circumferential direction of these inclined grooves over the whole region in the tire width direction. Accordingly, it is possible to suppress uneven wear in the tire circumferential direction. Note that in order to obtain this effect at an even higher level, preferably the angle thus formed is not less than 60° and more preferably is not less than 70°.

EXAMPLES

Pneumatic tires according to Working Example 1 to 13 and a pneumatic tire according to a Conventional Example, which had a tire size of 215/45R17 87W, were manufactured according to the following various conditions shown in Tables 1-1 to 1-3 on the constituents 12 to 30 illustrated in FIG. 1:

(1-1) Relationship between the block pitch length Po of the outer block row 22 and the block pitch length Pi of the inner block row 24 (block pitch length relationship), (1-2) Relationship between the inter-circumferential groove region dimensions Sr, So, Si of the rib 20, the outer block row 22, and the inner block row 24 (inter-circumferential groove region dimension relationship), (1-3) Formation aspect of the inclined groove 16a defining and forming the rib 20 (formation aspect of inclined groove 16a), (2) Status of change in the groove width when the inclined grooves 16b, 16c defining and forming the outer block row 22 and the inclined groove 16d defining and forming the inner block row 24 extend toward the outer side in the tire width direction (status of change in groove width of inclined grooves 16b, 16c, 16d), (3) Relationship between the sum total of the periphery length L1 of the inclined grooves in the vehicle mounting inner side region and the sum total of the periphery length L2 of the inclined grooves in the vehicle mounting outer side region (relationship between sum totals of periphery lengths of inclined grooves), (4-1) Whether at least one of the inclined grooves 16b, 16c and the inclined groove 16d each have at least one bent portion (presence of bent portion in inclined grooves), (4-2) Relationship between the number of bent portions in the inner block row 24 and the number of bent portions in the outer block row 22 (relationship between the numbers of bent portions), (5) Whether or not the inclined groove 16b and the inclined groove 16d have raised bottoms in the portions contiguous with the circumferential grooves 12a, 12b on the inner side in the tire width direction (presence of raised bottom portion), (6) Whether or not at least one of the circumferential grooves 12b, 12d in the vehicle mounting inner side region (the circumferential groove 12b in the example illustrated in FIG. 1) has at least one bent portion (presence of bent portion), (7) Relationship between the sum total of the periphery length L3 of the sipes in the vehicle mounting inner side region and the sum total of the periphery length L4 of the sipes in the vehicle mounting outer side region (relationship between sum totals of periphery lengths of sipes), (8-1) Whether or not another inclined groove 16f is formed along the extended line of the inclined groove 16e via the land portion (presence/absence of inclined grooves formed intermittently on the vehicle mounting outer side), (8-2) Whether or not the inclined grooves 16h is formed from the circumferential groove 12d to the ground contact edge E2 (the whole region in the tire width direction) (presence/absence of inclined grooves formed continuously on vehicle mounting inner side), (9) Relationship between the sum total of the area A1 of the circumferential grooves in the vehicle mounting outer side region and the sum total of the area A2 of the circumferential grooves in the vehicle mounting inner side region (relationship between sum totals of areas of circumferential grooves), (10) Relationship between the sum total of the area A3 of the inclined grooves in the vehicle mounting inner side region and the sum total of the area A4 of the inclined grooves in the vehicle mounting outer side region (relationship between sum totals of areas of inclined grooves), (11) Whether or not the inclined grooves extending from the circumferential groove on the vehicle mounting inner side to the inner side in the vehicle width direction and arranged in the rib extend over the tire equatorial plane and terminate in the land portion (arrangement aspect of inclined grooves in rib), (12) Whether or not, in both sides of the circumferential grooves, which define and form the rib, in the tire width direction on the vehicle mounting inner side, at least the communicating portions of the inclined grooves that communicate with the circumferential grooves extend to the same side in the tire circumferential direction from the vehicle mounting inner side toward the vehicle mounting outer side (relationship between communicating portions of inclined grooves on both sides of circumferential grooves defining and forming rib), and (13) Whether or not the longest extending portion of the inclined groove arranged in the inner block row and the longest extending portion of the inclined groove arranged in the outer block row extend forming an angle of not less than 50° and less than 90° in the counterclockwise direction relative to the tire circumferential direction (angle formed by the longest extending portion of inner-side inclined groove and the angle formed by the longest extending portion of outer-side inclined groove (counterclockwise relative to tire circumferential direction)).

Each of the test tires that were manufactured in this way were fitted to a regular rim (having a rim size of 17×7J), inflated to an internal pressure of 230 kPa, and mounted to a vehicle (front engine front drive type) with the displacement of 1800 cc with a load equal to 75% of the regular load applied, and the steering stability performance on the dry road surface, the steering stability performance on the snow-covered road surface, and the steering stability performance on the wet road surface were evaluated. The results are also shown in Table 1-1 to Table 1-3.

(Steering Stability Performance on Dry Road Surface)

Sensory evaluation was carried out by panelists when driving at 100 km/h on the dry road surface. Then index evaluation was carried out based on the measured results using Conventional Example as standard (100). With this evaluation the larger the index the higher the steering stability performance on the dry road surface.

(Steering Stability Performance on Snow-Covered Road Surface)

Sensory evaluation was carried out by panelists when driving at 40 km/h on the snow-covered road surface. Then index evaluation was carried out based on the measured results using Conventional Example as standard (100). With this evaluation the larger the index the higher the steering stability performance on the snow-covered road surface.

(Steering Stability Performance on Wet Road Surface)

Sensory evaluation was carried out by panelists when driving at 80 km/h on the wet road surface. Then index evaluation was carried out based on the measured results using Conventional Example as standard (100). With this evaluation the larger the index the higher the wet steering stability performance.

TABLE 1-1

| Condition No. | | Conventional Example | Working Example 1 | Working Example 2 |
|---|---|---|---|---|
| 1-1 | Block pitch length relationship | Po = Pi | Po > Pi | Po > Pi |
| 1-2 | Inter-circumferential groove region dimension relationship | Sr = So = Si | Sr < So < Si | Sr < So < Si |

TABLE 1-1-continued

| | | | | |
|---|---|---|---|---|
| 1-3 | Formation aspect of inclined groove 16a | Open to circumferential groove 12a | Open to circumferential groove 12b | Open to circumferential groove 12b |
| 2 | Status of change in groove width of inclined grooves 16b, 16c, 16d | No change | No change | Widen toward the outer side in the tire width direction |
| 3 | Relationship between sum totals of periphery lengths of inclined grooves | L1 = L2 | L1 = L2 | L1 = L2 |
| 4-1 | Presence of bent portion in inclined groove | Absence | Absence | Absence |
| 4-2 | Relationship between the numbers of bent portions | Same | Same | Same |
| 5 | Presence of raised bottom portion | Absence | Absence | Absence |
| 6 | Presence of bent portion | Absence | Absence | Absence |
| 7 | Relationship between sum totals of periphery lengths of sipes | L3 = L4 | L3 = L4 | L3 = L4 |
| 8-1 | Presence/absence of inclined grooves formed intermittently on vehicle mounting outer side | Inclined groove 16e extending to ground contact edge E1 | Inclined groove 16e extending to ground contact edge E1 | Inclined groove 16e extending to ground contact edge E1 |
| 8-2 | Presence/absence of inclined grooves formed continuously on vehicle mounting inner side | Inclined groove 16h formed in whole region in tire width direction | Inclined groove 16h formed in whole region in tire width direction | Inclined groove 16h formed in whole region in tire width direction |
| 9 | Relationship between sum totals of areas of circumferential grooves | A1 = A2 | A1 = A2 | A1 = A2 |
| 10 | Relationship between sum totals of areas of inclined grooves | A3 = A4 | A3 = A4 | A3 = A4 |
| 11 | Arrangement aspect of inclined grooves in rib | Extend over tire equatorial plane and not terminate in the land portion | Extend over tire equatorial plane and not terminate in the land portion | Extend over tire equatorial plane and not terminate in the land portion |
| 12 | Relationship between communicating portions of inclined grooves on both sides of circumferential grooves defining and forming rib | Not extend to same side | Not extend to same side | Not extend to same side |
| 13 | Angle formed by longest extending portion of inner-side inclined groove and angle formed by longest extending portion of outer-side inclined groove (counterclockwise to tire circumferential direction) | Inside: 93° Outside: 87° | Inside: 93° Outside: 87° | Inside: 93° Outside: 87° |
| | Steering stability performance on dry road surface | 100 | 106 | 106 |
| | Steering stability performance on snow-covered road surface | 100 | 104 | 104 |
| | Steering stability on wet road surface | 100 | 104 | 107 |

| Condition No. | | Working Example 3 | Working Example 4 | Working Example 5 |
|---|---|---|---|---|
| 1-1 | Block pitch length relationship | Po > Pi | Po > Pi | Po > Pi |
| 1-2 | Inter-circumferential groove region dimension relationship | Sr < So < Si | Sr < So < Si | Sr < So < Si |

TABLE 1-1-continued

| | | | | |
|---|---|---|---|---|
| 1-3 | Formation aspect of inclined groove 16a | Open to circumferential groove 12b | Open to circumferential groove 12b | Open to circumferential groove 12b |
| 2 | Status of change in groove width of inclined grooves 16b, 16c, 16d | Widen toward the outer side in the tire width direction | Widen toward the outer side in the tire width direction | Widen toward the outer side in the tire width direction |
| 3 | Relationship between sum totals of periphery lengths of inclined grooves | L1 > L2 | L1 > L2 | L1 > L2 |
| 4-1 | Presence of bent portion in inclined groove | Absence | 1 in inclined groove 16b, 2 in inclined groove 16d | 1 in inclined groove 16b, 2 in inclined groove 16d |
| 4-2 | Relationship between the numbers of bent portions | Same | Greater in inner block row 24 | Greater in inner block row 24 |
| 5 | Presence of raised bottom portion | Absence | Absence | Presence of raised bottom portions 16b2, 16d2 |
| 6 | Presence of bent portion | Absence | Absence | Absence |
| 7 | Relationship between sum totals of periphery lengths of sipes | L3 = L4 | L3 = L4 | L3 = L4 |
| 8-1 | Presence/absence of inclined grooves formed intermittently on vehicle mounting outer side | Inclined groove 16e extending to ground contact edge E1 | Inclined groove 16e extending to ground contact edge E1 | Inclined groove 16e extending to ground contact edge E1 |
| 8-2 | Presence/absence of inclined grooves formed continuously on vehicle mounting inner side | Inclined groove 16h formed in whole region in tire width direction | Inclined groove 16h formed in whole region in tire width direction | Inclined groove 16h formed in whole region in tire width direction |
| 9 | Relationship between sum totals of areas of circumferential grooves | A1 = A2 | A1 = A2 | A1 = A2 |
| 10 | Relationship between sum totals of areas of inclined grooves | A3 = A4 | A3 = A4 | A3 = A4 |
| 11 | Arrangement aspect of inclined grooves in rib | Extend over tire equatorial plane and not terminate in the land portion | Extend over tire equatorial plane and not terminate in the land portion | Extend over tire equatorial plane and not terminate in the land portion |
| 12 | Relationship between communicating portions of inclined grooves on both sides of circumferential grooves defining and forming rib | Not extend to same side | Not extend to same side | Not extend to same side |
| 13 | Angle formed by longest extending portion of inner-side inclined groove and angle formed by longest extending portion of outer-side inclined groove (counterclockwise to tire circumferential direction) | Inside: 93° Outside: 87° | Inside: 93° Outside: 87° | Inside: 93° Outside: 87° |
| Steering stability performance on dry road surface | | 104 | 104 | 106 |
| Steering stability performance on snow-covered road surface | | 106 | 108 | 108 |
| Steering stability on wet road surface | | 107 | 105 | 107 |

TABLE 1-2

| Condition No. | | Conventional Example | Working Example 6 | Working Example 7 |
|---|---|---|---|---|
| 1-1 | Block pitch length relationship | Po = Pi | Po > Pi | Po > Pi |
| 1-2 | Inter-circumferential groove region dimension relationship | Sr = So = Si | Sr < So < Si | Sr < So < Si |
| 1-3 | Formation aspect of inclined groove 16a | Open to circumferential groove 12a | Open to circumferential groove 12b | Open to circumferential groove 12b |
| 2 | Status of change in groove width of inclined grooves 16b, 16c, 16d | No change | Widen toward the outer side in the tire width direction | Widen toward the outer side in the tire width direction |
| 3 | Relationship between sum totals of periphery lengths of inclined grooves | L1 = L2 | L1 > L2 | L1 > L2 |
| 4-1 | Presence of bent portion in inclined groove | Absence | 1 in inclined groove 16b, 2 in inclined groove 16d | 1 in inclined groove 16b, 2 in inclined groove 16d |
| 4-2 | Relationship between the numbers of bent portions | Same | Greater in inner block row 24 | Greater in inner block row 24 |
| 5 | Presence of raised bottom portion | Absence | Presence of raised bottom portions 16b2, 16d2 | Presence of raised bottom portions 16b2, 16d2 |
| 6 | Presence of bent portion | Absence | Presence on circumferential groove 12b | Presence on circumferential groove 12b |
| 7 | Relationship between sum totals of periphery lengths of sipes | L3 = L4 | L3 = L4 | L3 > L4 |
| 8-1 | Presence/absence of inclined grooves formed intermittently on vehicle mounting outer side | Inclined groove 16e extending to ground contact edge E1 | Inclined groove 16e extending to ground contact edge E1 | Inclined groove 16e extending to ground contact edge E1 |
| 8-2 | Presence/absence of inclined grooves formed continuously on the vehicle mounting inner side | Inclined groove 16h formed in whole region in tire width direction | Inclined groove 16h formed in whole region in tire width direction | Inclined groove 16h formed in whole region in tire width direction |
| 9 | Relationship between sum totals of areas of circumferential grooves | A1 = A2 | A1 = A2 | A1 = A2 |
| 10 | Relationship between sum totals of areas of inclined grooves | A3 = A4 | A3 = A4 | A3 = A4 |
| 11 | Arrangement aspect of inclined grooves in rib | Extend over tire equatorial plane and not terminate in the land portion | Extend over tire equatorial plane and not terminate in the land portion | Extend over tire equatorial plane and not terminate in the land portion |
| 12 | Relationship between communicating portions of inclined grooves on both sides of circumferential grooves defining and forming rib | Not extend to same side | Not extend to same side | Not extend to same side |
| 13 | Angle formed by longest extending portion of inner-side inclined groove and angle formed by longest extending portion of outer-side inclined groove (counterclockwise to tire circumferential direction) | Inside: 93° Outside: 87° | Inside: 93° Outside: 87° | Inside: 93° Outside: 87° |
| Steering stability performance on dry road surface | | 100 | 106 | 106 |
| Steering stability performance on snow-covered road surface | | 100 | 111 | 113 |
| Steering stability on wet road | | 100 | 107 | 107 |

TABLE 1-2-continued surface

| Condition No. | | Working Example 8 | Working Example 9 | Working Example 10 |
|---|---|---|---|---|
| 1-1 | Block pitch length relationship | Po > Pi | Po > Pi | Po > Pi |
| 1-2 | Inter-circumferential groove region dimension relationship | Sr < So < Si | Sr < So < Si | Sr < So < Si |
| 1-3 | Formation aspect of inclined groove 16a | Open to circumferential groove 12b | Open to circumferential groove 12b | Open to circumferential groove 12b |
| 2 | Status of change in groove width of inclined grooves 16b, 16c, 16d | Widen toward the outer side in the tire width direction | Widen toward the outer side in the tire width direction | Widen toward the outer side in the tire width direction |
| 3 | Relationship between sum totals of periphery lengths of inclined grooves | L1 > L2 | L1 > L2 | L1 > L2 |
| 4-1 | Presence of bent portion in inclined groove | 1 in inclined groove 16b, 2 in inclined groove 16d | 1 in inclined groove 16b, 2 in inclined groove 16d | 1 in inclined groove 16b, 2 in inclined groove 16d |
| 4-2 | Relationship between the numbers of bent portions | Greater in inner block row 24 | Greater in inner block row 24 | Greater in inner block row 24 |
| 5 | Presence of raised bottom portion | Presence of raised bottom portions 16b2, 16d2 | Presence of raised bottom portions 16b2, 16d2 | Presence of raised bottom portions 16b2, 16d2 |
| 6 | Presence of bent portion | Presence on circumferential groove 12b | Presence on circumferential groove 12b | Presence on circumferential groove 12b |
| 7 | Relationship between sum totals of periphery lengths of sipes | L3 > L4 | L3 > L4 | L3 > L4 |
| 8-1 | Presence/absence of inclined grooves formed intermittently on vehicle mounting outer side | Inclined groove 16f formed along extended line of inclined groove 16e via land portion | Inclined groove 16f formed along extended line of inclined groove 16e via land portion | Inclined groove 16f formed along extended line of inclined groove 16e via land portion |
| 8-2 | Presence/absence of inclined grooves formed continuously on the vehicle mounting inner side | Inclined groove 16h formed in whole region in tire width direction | Inclined groove 16h formed in whole region in tire width direction | Inclined groove 16h formed in whole region in tire width direction |
| 9 | Relationship between sum totals of areas of circumferential grooves | A1 = A2 | A1 > A2 | A1 > A2 |
| 10 | Relationship between sum totals of areas of inclined grooves | A3 = A4 | A3 = A4 | A3 > A4 |
| 11 | Arrangement aspect of inclined grooves in rib | Extend over tire equatorial plane and not terminate in the land portion | Extend over tire equatorial plane and not terminate in the land portion | Extend over tire equatorial plane and not terminate in the land portion |
| 12 | Relationship between communicating portions of inclined grooves on both sides of circumferential grooves defining and forming rib | Not extend to same side | Not extend to same side | Not extend to same side |
| 13 | Angle formed by longest extending portion of inner-side inclined groove and angle formed by longest extending portion of outer-side inclined groove (counterclockwise to tire circumferential direction) | Inside: 93° Outside: 87° | Inside: 93° Outside: 87° | Inside: 93° Outside: 87° |
| Steering stability performance on dry road surface | | 108 | 107 | 108 |

TABLE 1-2-continued

| | | | |
|---|---|---|---|
| Steering stability performance on snow-covered road surface | 111 | 111 | 113 |
| Steering stability on wet road surface | 105 | 107 | 107 |

TABLE 1-3

| Condition No. | | Conventional Example | Working Example 11 | Working Example 12 | Working Example 13 |
|---|---|---|---|---|---|
| 1-1 | Block pitch length relationship | Po = Pi | Po > Pi | Po > Pi | Po > Pi |
| 1-2 | Inter-circumferential groove region dimension relationship | Sr = So = Si | Sr < So < Si | Sr < So < Si | Sr < So < Si |
| 1-3 | Formation aspect of inclined groove 16a | Open to circumferential groove 12a | Open to circumferential groove 12b | Open to circumferential groove 12b | Open to circumferential groove 12b |
| 2 | Status of change in groove width of inclined grooves 16b, 16c, 16d | No change | Widen toward the outer side in the tire width direction | Widen toward the outer side in the tire width direction | Widen toward the outer side in the tire width direction |
| 3 | Relationship between sum totals of periphery lengths of inclined grooves | L1 = L2 | L1 > L2 | L1 > L2 | L1 > L2 |
| 4-1 | Presence of bent portion in inclined groove | Absence | 1 in inclined groove 16b, 2 in inclined groove 16d | 1 in inclined groove 16b, 2 in inclined groove 16d | 1 in inclined groove 16b, 2 in inclined groove 16d |
| 4-2 | Relationship between the numbers of bent portions | Same | Greater in inner block row 24 | Greater in inner block row 24 | Greater in inner block row 24 |
| 5 | Presence of raised bottom portion | Absence | Presence of raised bottom portions 16b2, 16d2 | Presence of raised bottom portions 16b2, 16d2 | Presence of raised bottom portions 16b2, 16d2 |
| 6 | Presence of bent portion | Absence | Presence on circumferential groove 12b | Presence on circumferential groove 12b | Presence on circumferential groove 12b |
| 7 | Relationship between sum totals of periphery lengths of sipes | L3 = L4 | L3 > L4 | L3 > L4 | L3 > L4 |
| 8-1 | Presence/absence of inclined grooves formed intermittently on vehicle mounting outer side | Inclined groove 16e extending to ground contact edge E1 | Inclined groove 16f formed along extended line of inclined groove 16e via land portion | Inclined groove 16f formed along extended line of inclined groove 16e via land portion | Inclined groove 16f formed along extended line of inclined groove 16e via land portion |
| 8-2 | Presence/absence of inclined grooves formed continuously on vehicle mounting inner side | Inclined groove 16h formed in whole region in tire width direction | Inclined groove 16h formed in whole region in tire width direction | Inclined groove 16h formed in whole region in tire width direction | Inclined groove 16h formed in whole region in tire width direction |
| 9 | Relationship between sum totals of areas of circumferential grooves | A1 = A2 | A1 > A2 | A1 > A2 | A1 > A2 |
| 10 | Relationship between sum totals of areas of inclined grooves | A3 = A4 | A3 > A4 | A3 > A4 | A3 > A4 |
| 11 | Arrangement aspect of inclined grooves in rib | Extend over tire equatorial plane and not terminate in the land portion | Extend over tire equatorial plane and not terminate in the land portion | Extend over tire equatorial plane and not terminate in the land portion | Extend over tire equatorial plane and not terminate in the land portion |
| 12 | Relationship between communicating portions of inclined grooves on both sides of circumferential grooves defining and forming rib | Not extend to same side | Not extend to same side | Extend to same side | Extend to same side |

TABLE 1-3-continued

| Condition No. | | Conventional Example | Working Example 11 | Working Example 12 | Working Example 13 |
|---|---|---|---|---|---|
| 13 | Angle formed by longest extending portion of inner-side inclined groove and angle formed by longest extending portion of outer-side inclined groove (counterclockwise to tire circumferential direction) | Inside: 93°<br>Outside: 87° | Inside: 93°<br>Outside: 87° | Inside: 93°<br>Outside: 87° | Inside: 87°<br>Outside: 87° |
| | Steering stability performance on dry road surface | 100 | 108 | 108 | 108 |
| | Steering stability performance on snow-covered road surface | 100 | 115 | 115 | 117 |
| | Steering stability on wet road surface | 100 | 109 | 111 | 113 |

According to Table 1-1 to Table 1-3, each of the pneumatic tires according to Working Example 1 to Working Example 13 which satisfies the technical scope of the present technology (satisfies the predetermined conditions for all of relationship of block pitch lengths Po, Pi on the both vehicle mounting sides, relationship of dimensions Sr, So, Si in tire width direction of the land portions arranged in a row in the tire width direction, aspect of how the inclined groove 16a that forms the rib 20 extends) can be seen to have higher steering stability performance on each type of road surfaces than the pneumatic tire according to Conventional Example which does not satisfy the technical scope of the present technology.

What is claimed is:

1. A pneumatic tire with a designated vehicle mounting direction, comprising:
   at least four circumferential grooves and a plurality of inclined grooves communicating with the circumferential grooves, wherein a rib including a tire equatorial plane, an outer block row located on a vehicle mounting outer side of the rib and an inner block row located on a vehicle mounting inner side of the rib are respectively defined and formed by two neighboring circumferential grooves among the at least four circumferential grooves;
   a block pitch length of the outer block row being greater than a block pitch length of the inner block row;
   dimensions in a tire width direction of regions interposed between two of the circumferential grooves being smaller in an order of the rib, the outer block row, and the inner block row, where a dimension of the rib is smaller than a dimension of the outer block row and of the inner block row, and where a dimension of the inner block row is greater than the dimension of the rib and of the outer block row; and
   the inclined grooves defining and forming the rib opening only to the circumferential groove in a vehicle mounting inner side region defining and forming the rib; wherein
   at least one of the inclined grooves in the outer block row directly extends between two neighboring circumferential grooves among the at least four circumferential grooves, and has at least one bent portion, and wherein at least one of the inclined grooves in the inner block row directly extends between two neighboring circumferential grooves among the at least four circumferential grooves, and has at least one bent portion; and
   a number of the bent portions in the inner block row is greater than a number of the bent portions in the outer block row.

2. The pneumatic tire according to claim 1, wherein
   the inclined grooves defining and forming the outer block row and the inclined grooves defining and forming the inner block row are wider toward an outer side in the tire width direction.

3. The pneumatic tire according to claim 1, wherein
   in a region from the circumferential groove on a vehicle mounting outermost side to the circumferential groove on a vehicle mounting innermost side, a sum total of periphery lengths of the inclined grooves in the vehicle mounting inner side region is greater than a sum total of periphery lengths of the inclined grooves in the vehicle mounting outer side region.

4. The pneumatic tire according to claim 1, wherein
   at least one of the inclined grooves defining and forming the outer block row and at least one of the inclined grooves defining and forming the inner block row each include a raised bottom portion contiguous with the circumferential groove on an inner side in the tire width direction.

5. The pneumatic tire according to claim 1, wherein
   at least one of the circumferential grooves in the vehicle mounting inner side region includes at least one bent portion.

6. The pneumatic tire according to claim 1, wherein
   in the region from the circumferential groove on a vehicle mounting outermost side to the circumferential groove on a vehicle mounting innermost side, a sum total of periphery lengths of sipes in the vehicle mounting inner side region is greater than a sum total of periphery lengths of sipes in the vehicle mounting outer side region.

7. The pneumatic tire according to claim 1, wherein
   in the region from the circumferential groove on a vehicle mounting outermost side to a ground contact edge on the vehicle mounting outer side, an additional inclined groove is formed along an extended line of a first inclined groove of the plurality of inclined grooves via a land portion on the vehicle mounting outermost side, and in the region from the circumferential groove on a vehicle mounting innermost side to a ground contact edge on the vehicle mounting inner side, a second inclined groove of the plurality of inclined grooves is formed entirely in the tire width direction.

8. The pneumatic tire according to claim 1, wherein a sum total of areas of the circumferential grooves in the vehicle mounting outer side region is greater than a sum total of areas of the circumferential grooves in the vehicle mounting inner side region.

9. The pneumatic tire according to claim 1, wherein a sum total of areas of the inclined grooves in the vehicle mounting inner side region is greater than a sum total of areas of the inclined grooves in the vehicle mounting outer side region.

10. The pneumatic tire according to claim 7, wherein the inclined grooves arranged in the rib extend from the circumferential groove on the vehicle mounting inner side toward the vehicle mounting outer side so as to pass over the tire equatorial plane and to terminate in the land portion.

11. The pneumatic tire according to claim 1, wherein on both sides in the tire width direction of the circumferential groove on the vehicle mounting inner side defining and forming the rib, at least communicating portions of the inclined grooves communicating with the circumferential groove extend to a same side in a tire circumferential direction from the vehicle mounting inner side toward the vehicle mounting outer side.

12. The pneumatic tire according to claim 1, wherein a longest extending portion of the inclined groove arranged in the inner block row and a longest extending portion of the inclined groove arranged in the outer block row extend to a same side in a tire circumferential direction from the vehicle mounting inner side toward the vehicle mounting outer side.

13. The pneumatic tire according to claim 1, wherein a ground contact portion of the inclined groove arranged on the outer side in the tire width direction of the circumferential groove on a vehicle mounting outermost side and a ground contact portion of the inclined groove arranged on the outer side in the tire width direction of the circumferential groove on a vehicle mounting innermost side each extend so as to form an angle not less than 50° and less than 90° in a counterclockwise direction relative to a tire circumferential direction.

14. The pneumatic tire according to claim 1, wherein the at least one of the inclined grooves defining and forming the outer block row and the at least one of the inclined grooves defining and forming the inner block row each have a substantially constant groove width.

15. The pneumatic tire according to claim 1, wherein at least one of the inclined grooves in the outer block row directly extends between two neighboring circumferential grooves among the at least four circumferential grooves, and has one bent portion, and wherein at least one of the inclined grooves in the inner block row directly extends between two neighboring circumferential grooves among the at least four circumferential grooves, and has two bent portions.

16. The pneumatic tire according to claim 1, wherein the bent portion in the outer block row is formed on an inner side in a tire width direction.

* * * * *